(12) United States Patent
Cronin et al.

(10) Patent No.: US 11,170,153 B2
(45) Date of Patent: Nov. 9, 2021

(54) SMART PROCEDURE PARSER

(71) Applicant: Devbridge Group, LLC, Chicago, IL (US)

(72) Inventors: Bill Cronin, Chicago, IL (US); John Ciecholewski, Chicago, IL (US); Tadas Zilinskas, Kaunas (LT)

(73) Assignee: Lean Power LLC, Chicago, IL (US)

( * ) Notice: Subject to any disclaimer, the term of this patent is extended or adjusted under 35 U.S.C. 154(b) by 0 days.

(21) Appl. No.: 16/835,273

(22) Filed: Mar. 30, 2020

(65) Prior Publication Data
US 2020/0311334 A1  Oct. 1, 2020

Related U.S. Application Data

(60) Provisional application No. 62/826,396, filed on Mar. 29, 2019.

(51) Int. Cl.
*G06F 40/103* (2020.01)
*G06F 16/23* (2019.01)
*G06F 9/48* (2006.01)

(52) U.S. Cl.
CPC ........ *G06F 40/103* (2020.01); *G06F 9/4843* (2013.01); *G06F 16/2379* (2019.01)

(58) Field of Classification Search
CPC .................................................. G06F 40/103
See application file for complete search history.

(56) References Cited

U.S. PATENT DOCUMENTS

| | | | | |
|---|---|---|---|---|
| 2004/0205621 | A1* | 10/2004 | Johnson et al. | ........ G06F 17/24 |
| 2005/0273573 | A1* | 12/2005 | Liu et al. | ................ G06F 12/08 |
| 2011/0025842 | A1* | 2/2011 | King et al. | ............... H04N 7/18 |

* cited by examiner

*Primary Examiner* — James J Debrow
(74) *Attorney, Agent, or Firm* — K&L Gates LLP (57) ABSTRACT

The present systems and methods are for processing data for monitoring, managing, and displaying a plurality of work flow processes. Specifically, the present system is configured to convert an original workflow document including a plurality of tasks to an interactive procedure platform having the capability of incorporating enriching content correlating to the task elements for receiving input from a user.

16 Claims, 8 Drawing Sheets

| Electrical Work Practices | | NMP-FLS-003 |
|---|---|---|
| | DataGlance | Version 2.0 |
| | | Page 43 of 46 |

ATTACHMENT 3
Page 1 of 1

ELECTRICAL SAFETY CHECKLIST

Reference Use

This form is discussed during the pre-job briefing. Items briefed are based on the hazards involved in the activity.

WO/Surv # ____________ (If Applicable)

| (1) Description/justification of work to be performed: (eg. INSTALLING JUMPER, RACKING BREAKING...) | Date: |
|---|---|
| | |

| | | | |
|---|---|---|---|
| (2) Have the Arc Flash Calculations to be evaluated for this task? | Yes ☐ | No ☐ | N/A ☐ |
| (3) Have exposed energized parts (AC/DC) been identified? | Yes ☐ | No ☐ | N/A ☐ |

(4) Nominal voltage(s) to which employees will be exposed?
☐ ______ VAC/VDC      ☐ ______ VAC/VDC (5) Prohibited Boundary
  Avoid Contact ☐     1" ☐     7" ☐  Comments: ______

(6) Restricted Boundary
  Avoid Contact ☐     1" ☐     2'2" ☐  Comments: ______

(7) Limited Boundary
  Avoid Contact ☐     3'6" ☐     5' ☐  Comments: ______

(8) Flash Protection Boundary
  3'6" ☐     10' ☐     20' ☐  N/A ☐  Comments: ______

(9) Working Near live parts that might be accidentally contacted or where dangerous electrical heating or arcing might occur?
  Yes ☐ Cover Up Material Required     No ☐ Cover Up Material Not Required
Comments: ______

| (10) Manufactured Voltage Rated Tools Required | | | Yes ☐ No ☐ ☐ |
|---|---|---|---|
| Voltage Rated Gloves ☐ | Arc Hood ☐ | Arc Clothing ☐ | Flagging/barricades ☐ |
| Arc Face Shield ☐ | Rescue equipment (de.g., rescue hook) ☐ | Temporary protective Grounding ☐ | Safety Observer ☐ |
| Blankets ☐ | Mats ☐ | Use of locks ☐ | Lanyards for tools ☐ |

Other: Comments ______

APPROVALS

| Pre-job Brief Completed by Qualified Employee: | Date: |
|---|---|
| Responsible Supervisor:<br>Walk Down Performed  Yes ☐ N/A ☐ | Date: |
| Maintenance Manager or above:<br>Required for work on energized equipment (Refer to note prior to Section 4.2 Step 2e)<br>Note: Not applicable for metering, i.e. voltage or current readings. | Date: |
| Site Safety:<br>(This approval is only required when minimum PPE requirements are not met.) | Date: |

SMART PROCEDURE PARSER

CROSS-REFERENCE TO RELATED APPLICATIONS

This application incorporates by reference and claims the benefit of priority to U.S. Provisional Application 62/826,396 filed on Mar. 29, 2019.

BACKGROUND OF THE INVENTION

The present subject matter relates generally to systems and methods for processing data for monitoring, managing, and displaying a plurality of work flow processes.

Workflow is typically described as the order in which tasks take place to complete a process, such as a business process. A workflow engine allows a user to model business processes and control the order in which the activities associated with the business process are executed.

Conventional workflow procedures are written in a word processor documents (e.g., Microsoft Word™) and then printed or converted to a digital PDF (Portable Document Format) documents for execution. Conversion to a digital format is paramount for use with modern technology, such as mobile devices and tablets, especially in an industrial environment.

However, conventional technologies that convert a word processor documents to a PDFs precludes enriching content. In order to enrich the PDF content, processes have been developed to use a post-processing solution that applies a PDF overlay to the PDF document to create smart fiends on the PDF for the input of data for execution. However, PDF overlays are applied via a manual process that are costly and prone to error.

Further, conventional digital PDFs are extremely limiting in terms of input. For example, conventional digital PDFs lack the ability of verification, workflow automation, retrieving data from external sources, historical pattern recognition, among others. As a result, the use of conventional digital PDFs is very limited, cumbersome, and inefficient.

Accordingly, there is need for a conversion process for Word documents into a structured data format for smart procedures with the capability for incorporation of enriching content.

BRIEF SUMMARY OF THE INVENTION

The present disclosure provides systems and methods for processing data for monitoring, managing, and displaying a plurality of work flow processes. Moreover, the present system is configured to convert an original workflow document (e.g., a word processor document) including a plurality of tasks to an interactive procedure platform having the capability of incorporating enriching content. Various examples of the systems and methods are provided herein.

The present disclosure provides a system configured to convert a word processor document to a structured data format using pattern recognition of the content to recognize step types and attributes. The system converts a "dumb procedure" document format (i.e., a word document) into an interactive procedure platform by enriching the content with additional information during the parsing process based upon patterns analyzed within the original content to produce a smart document.

An advantage of the present system is providing a seamless experience in converting from paper-based procedures to an interactive procedure platform to maintain investment already made in paper procedures over many years by the industry. By automating the process of ingesting the existing "paper" procedure and providing an initial enrichment of the procedure to create a smart interactive procedure platform, the system significantly reduces the effort needed to create a smart procedure.

A further advantage of the present system is not only ingesting the original word processor based content, but also uses patterns in the syntax of the existing document format to extrapolate elements that can be automatically added to enrich the procedures steps.

Another advantage of the present system is distinguishing and discarding elements of the word processor document that cannot be ingested.

Another advantage of the present system is providing historical data from the smart document, wherein the system accumulates and analyzes the data from a plurality of received submitted completed procedures over time.

Another advantage of the present system is reducing human error by providing checks and verifying input before the completed task list is submitted. For example, the present system can automatically perform calculations based on the user's input data, reducing human error in calculations.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1A:
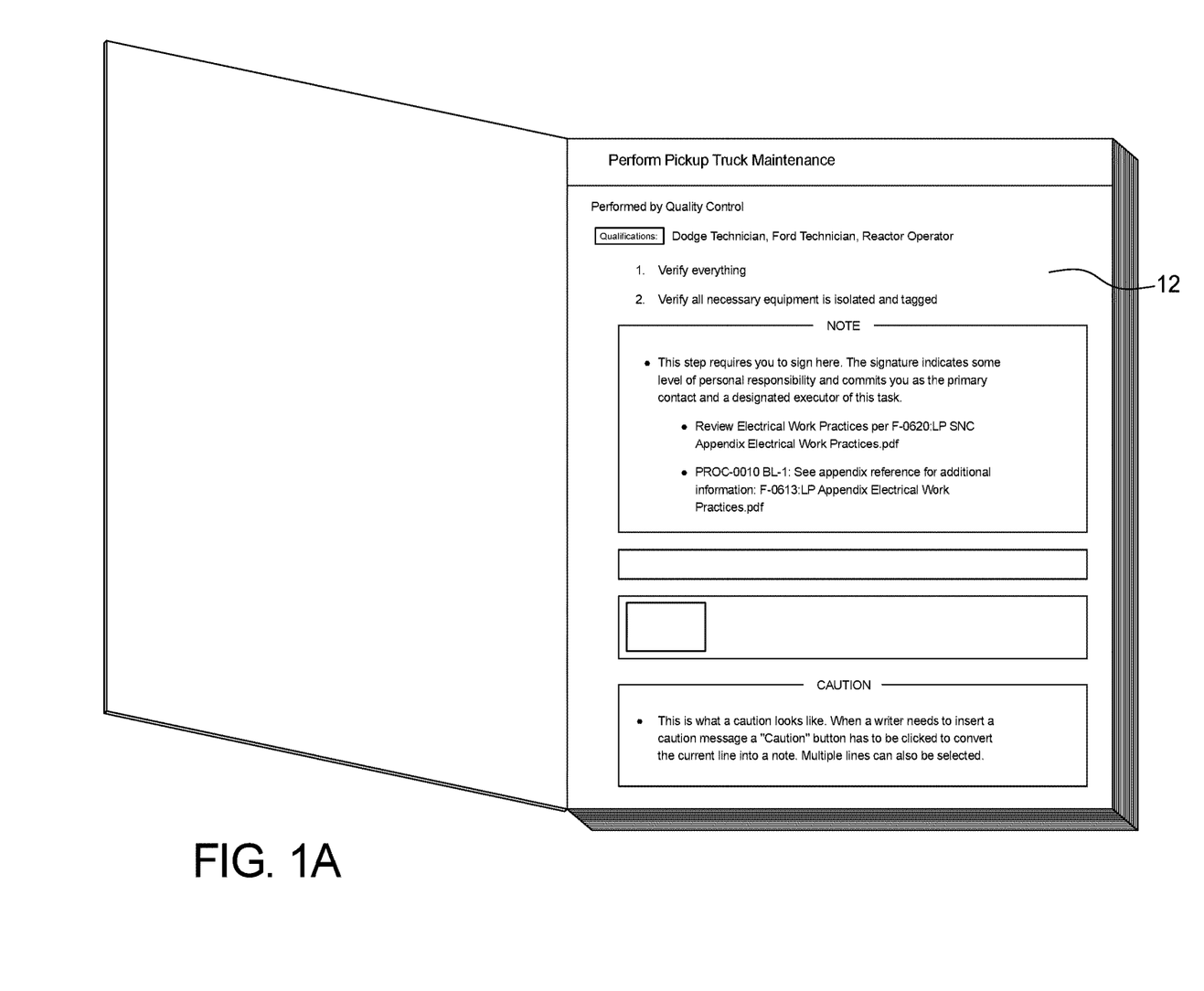
FIG. 1 is a schematic of an example of the system disclosed herein configured to convert an original procedure document into an interactive procedure platform.
Figure 1B:
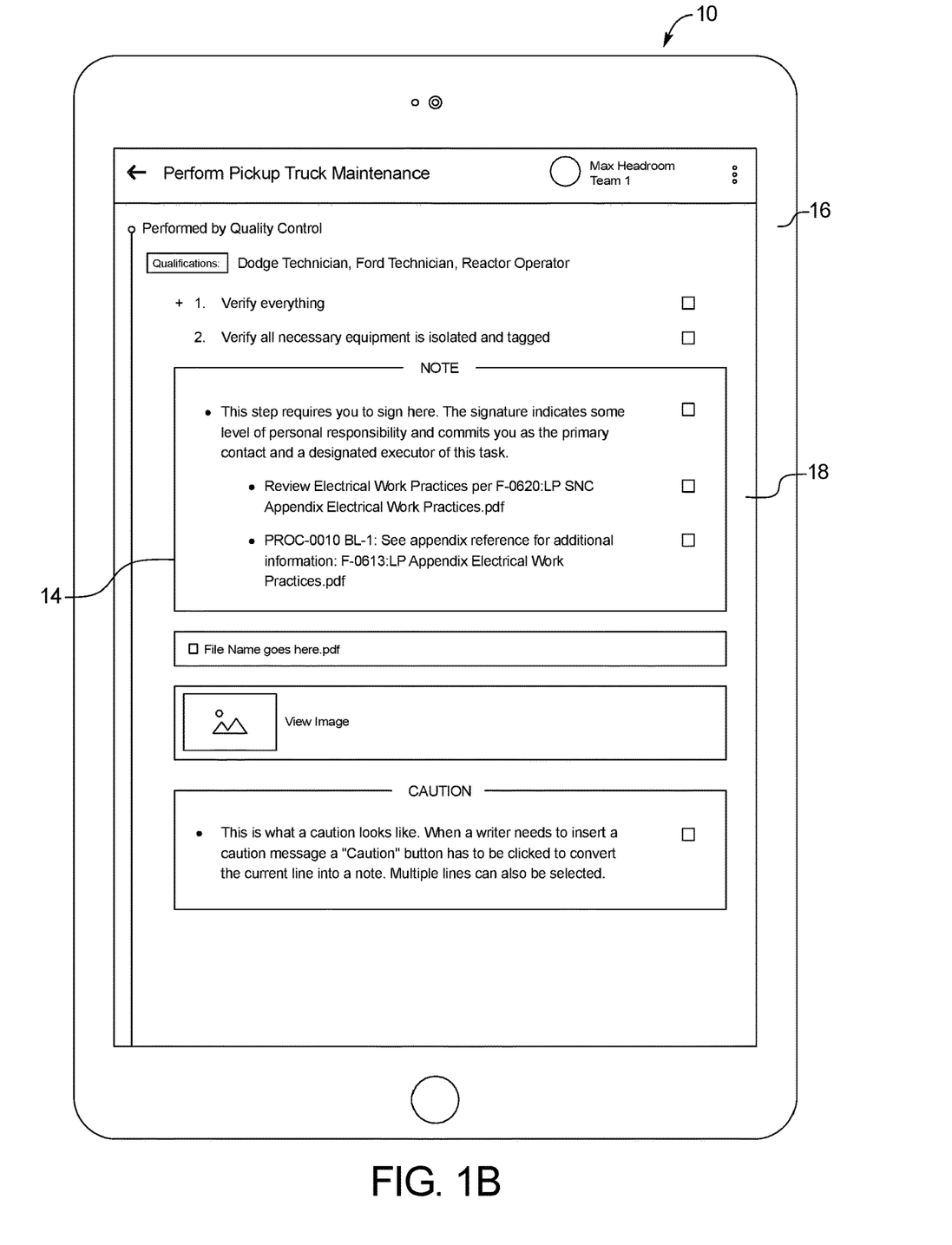

The present system is configured to convert an original word processor formatted document into an interactive procedure platform by identifying original elements within the original document that can be converted to smart elements based upon the content in the original document. As shown in FIG. 1, the system 10 can convert the original procedure document 12 into an interactive procedure platform 14, wherein the interactive procedure platform is accessed on a computer device 16 (e.g., smart phone, tablets, etc.) having a user interface 18 to engage the user.

For example, the system can input an original document 12 whose contents include a procedure including a list of actions (e.g., steps) for the user to complete. Conventionally, an employee would print out the procedure document, manually go through each procedure step, and manually check boxes on the printed document indicating the step is complete. In addition, the user may write down on the printed document data such as measurements, calculations typically performed using an external calculator, signatures, initials, among other data. The user could also write text or notes on the document for a third party to review (e.g., system manager, procedure development team, etc.).

In the present system, the original document 12 is converted, via a procedure parser, into an interactive procedure platform 14. The procedure parser, in communication with the controller, is an automated software tool requiring minimal user interaction that converts the original document 12 into the interactive procedure platform 14. For example, the user can select and upload the original document 12 to be parsed into the system 10, and the system 10, via the parser, converts the procedures provided in the original document 12 into an interactive procedure platform 14.

Figure 2:
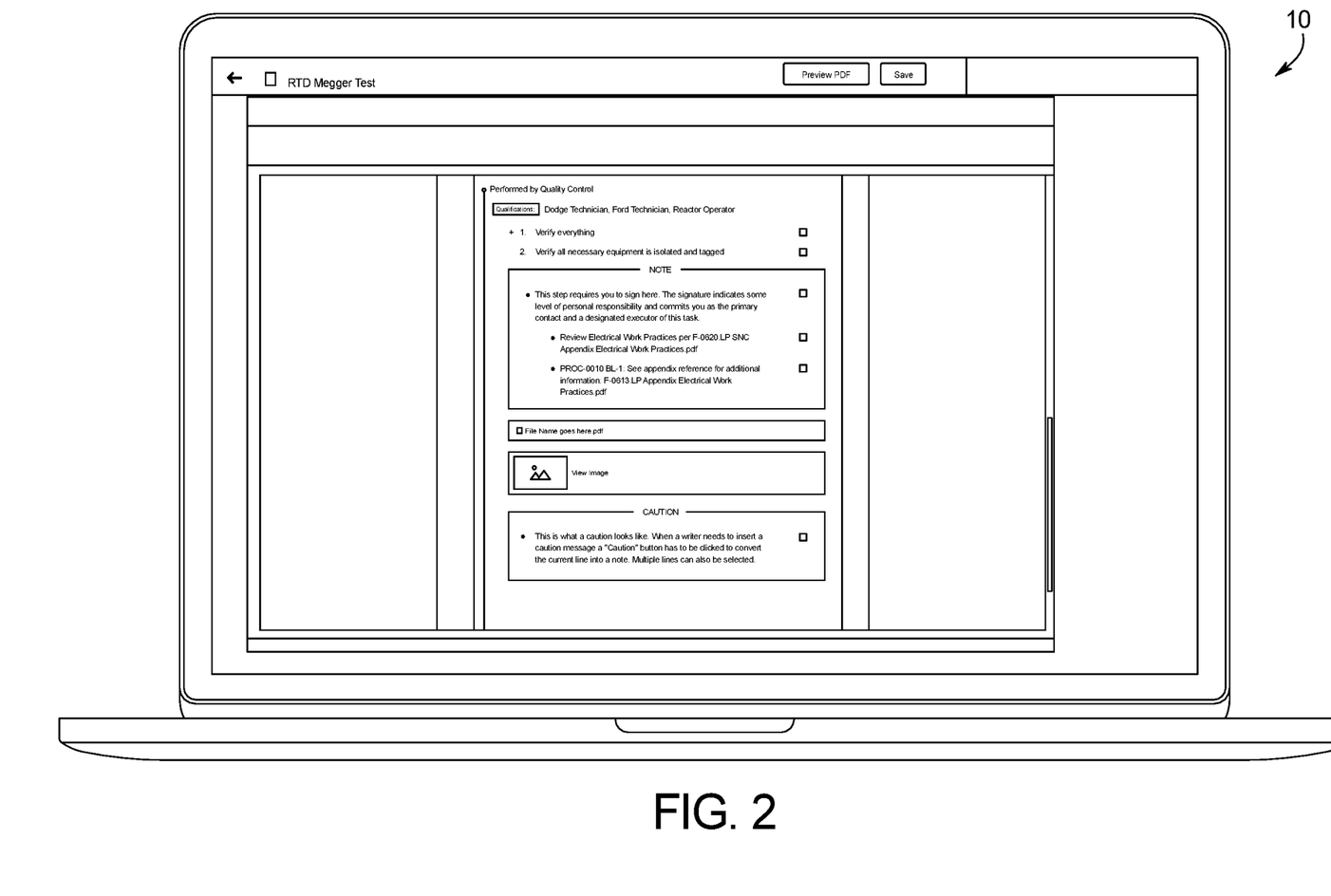
FIG. 2 is a schematic of an example of the system illustrating the engagement of the procedure parser to create the interactive procedure platform.

For example, as shown in FIG. 2, the parser can identify various categories of information in the original document 12 including checkbox/signature/initial formats, numbering schemes, parent-child relationships, ordered/unordered step types, among other patterns. The system 10 can convert the original element in the original document 12 to a smart element on the interactive procedure platform 14 that is then displayed on a user interface for engagement by the user.

Figure 3:
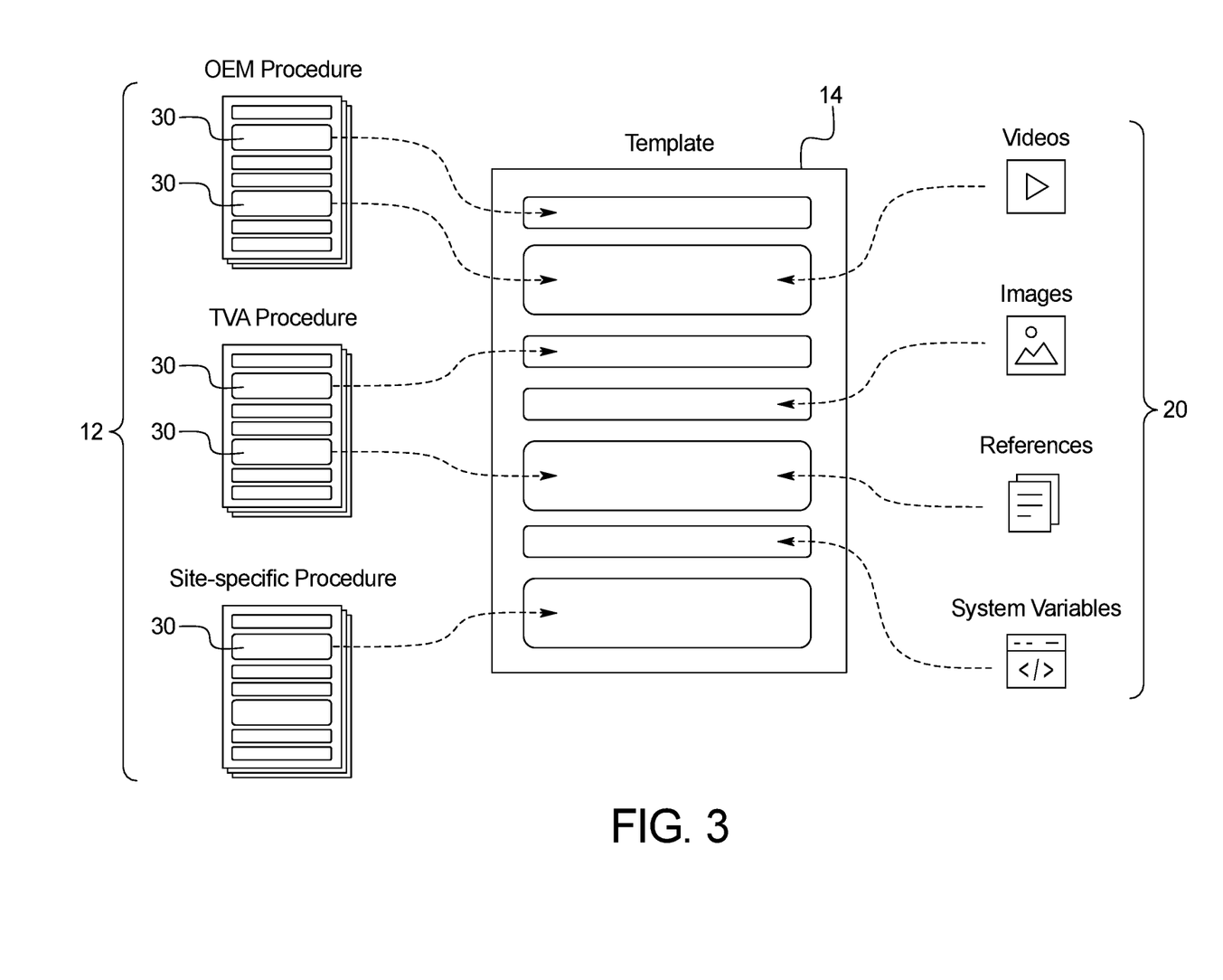
FIG. 3 is a schematic of an example of the system illustrating the tasks input from the original document and the input of smart elements into the smart interactive procedure platform.

As shown in FIG. 3, after the original document 12 is uploaded to the present platform, the system 10 identifies and imports the task/procedure steps 30 form the original document 12 and then associates and imports any one or more of a plethora of input smart options 20 into the interactive procedure platform 14 such that the interactive procedure platform 14 will be able to most efficiently collect the user input needed to complete the identified task/procedure steps 30. For example, the system 10 can automatically input smart options 20 including, but not limited to, initial box, signature box, QR or bar code scan input, data entry, text box, notification, date and time stamp, calculation, and table/graph, among others, based on the original elements in the original document 12.

For example, when the system 10 identifies and imports a signature line, identified by the text adjacent a signature space in the original document 12, the system 10 may further associate and import and digital signature input box into the interactive procedure platform 14. In other words, a combination of textual context plus formatting context in the original document 12 may be used to identify and import the appropriate smart option 20.

In another example, when the original document 12 includes a task/step 30 with an associated check box for the user to check upon completion of the task, the system 10 can convert the check box in the original document to a smart check box that the user can check/select on the user interface displaying the converted interactive procedure platform 14.

In another example, when the original document 12 includes a data entry space (i.e., formatting context), coupled with a unit of measurement (i.e., textual context), the system 10 may associate the appropriate smart option 20, for example, a scrolling wheel interface that enables quick selection of a numerical value with the appropriate associated measurements.

Similarly, when the original document 12 includes a task 30 with an associated text box for the user to complete a measurement and perform a calculation (as determined by the combination of textual and formatting contexts), the system can convert the text box to a smart option 20 for the input the measurement data, via the user interface, and the system can automatically perform the calculation based on the data input and display the calculation associated with the task.

In a particularly valuable example, the system 10 may identify a requested input in the original document 12 that may be performed by a device 16 that operates the interactive procedure platform 14 (for example, record a sound, take a photograph, record a video, etc.) and, when a user operates the converted procedure on the interactive procedure platform 14, the interactive procedure platform 14 may automatically configure the device 16 to capture the requested input. For example, after completing the preceding step in the work flow, the interactive procedure platform 14 used by the user to perform the work flow may automatically configure to capture the appropriate media (e.g., launch the camera application) and prompt the user to capture the appropriate data.

Similarly, in another example, when the original document 12 includes a time/date entry, the interactive procedure platform 14 can incorporate an automatic time/date stamp based on completion or selection or a check box, or otherwise, with the time/date information being provided by the device 16. The interactive procedure platform 14 can include an automatic location identification, wherein upon selection of a check box, the system 10 can confirm the location of the user using data provided by the device 16. For example, if a specific task 30 is performed at an exact location, if the user selects the check box associated with completion of the task 30, the system can record the user's location (via a GPS function of the smart device displaying the interactive procedure platform). Alternatively, or in addition to, the location can be determined by the user's device scanning a bar code on a specific equipment associated with the task. If the recorded location of the user does not match the specific location of the task 30, the system 10 can record an error. As a result, the system 10 can provide verifying information (i.e., corroborating evidence) that the task was or was not complete.

In an example, the system 10 automatically converts the original document 12 to the interactive procedure platform 14, including importing associated smart options 20 for each task in the original document 12. In addition, the system 10 can receive user input for edits or additional smart elements 20. Further, the user can create a new interactive procedure platform 14 directly from the system 10 (i.e., without uploading an original document).

Figure 4B:
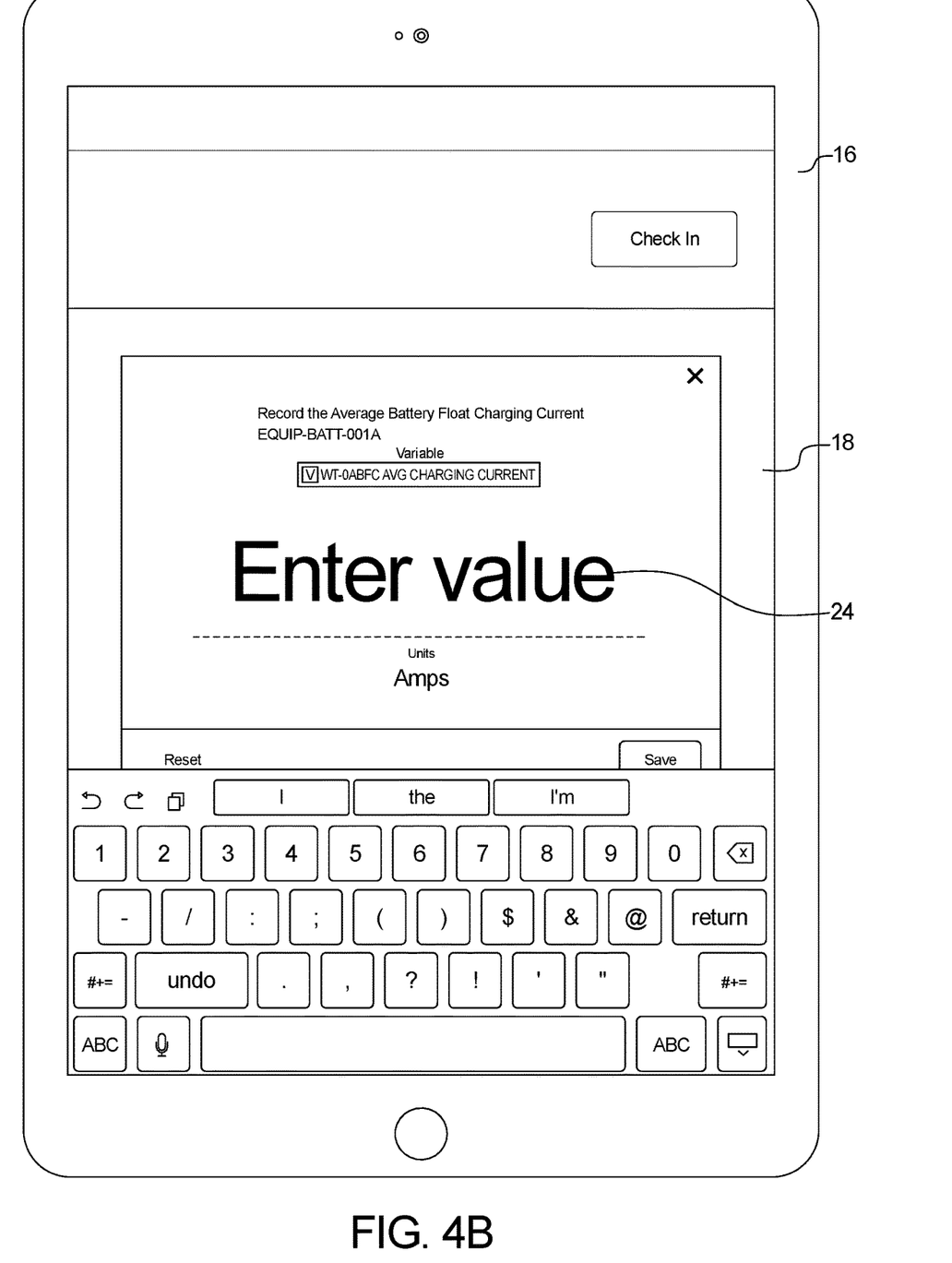
FIG. 4 is a schematic of an example of the system illustrating once the user selects an entry prompt on the interactive procedure platform, the system can display a larger entry box for the user to input data.

As shown in FIG. 4, the system 10 presents an advantage over conventional digital PDFs. For example, the present system 10 includes the option of once the user selects an input box 22 from the interactive procedure platform 14, the system 10 can expand the input box 22 to an expanded input box 24 for the user to engage. The expanded input box 24 is easier for users to see and engage with for information input.

Figure 5:
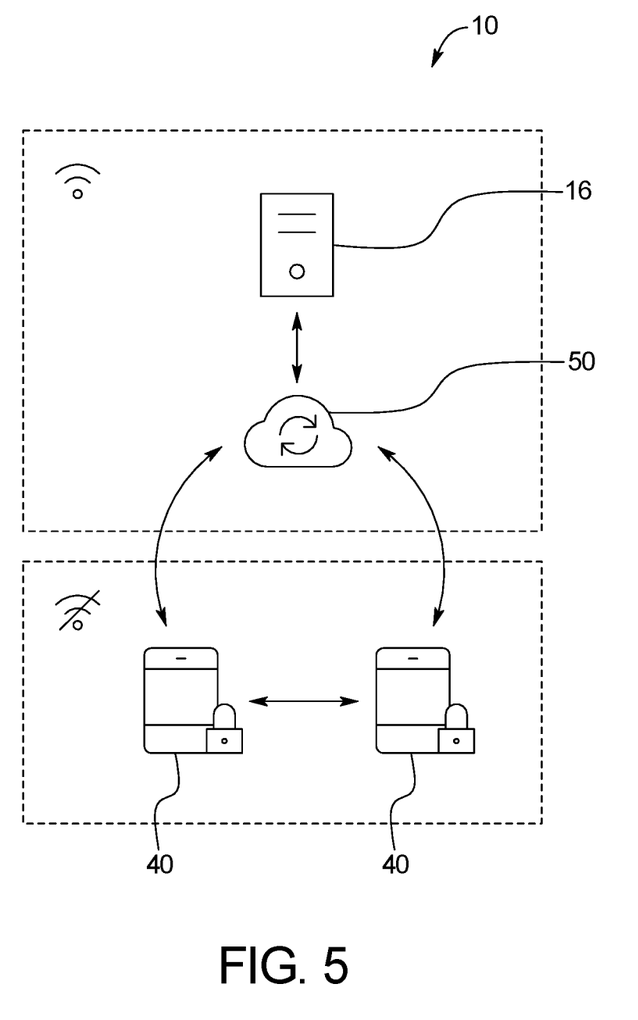
FIG. 5 is a schematic of an example of the system illustrating the interactive procedure platform in communication with a controller, wherein the controller is in communication with other online and offline devices to maintain synchronization of data across all platforms.

FIG. 5 illustrates the interaction of the system 10, via the controller 50, to the computer device 16 and database 40. The system 10 supports online and offline activity. The system 10 is capable of synchronizing data and uploading data from each computer device 16 upon each entry and/or upon each submission. For example, after a user has completed the tasks 30 in the interactive procedure platform 14, the user can submit the interactive procedure platform 14 as completed in the system 10. The system 10 can continually upload the task input data via the smart elements 20 continually. Alternatively, or in addition to, the system 10 can upload the accumulated data once the user submits the interactive procedure platform 14 as complete. The submitted procedure and associated task data input into the smart elements 20 can be analyzed and stored in a database in communication with the controller 50.

Figure 6:
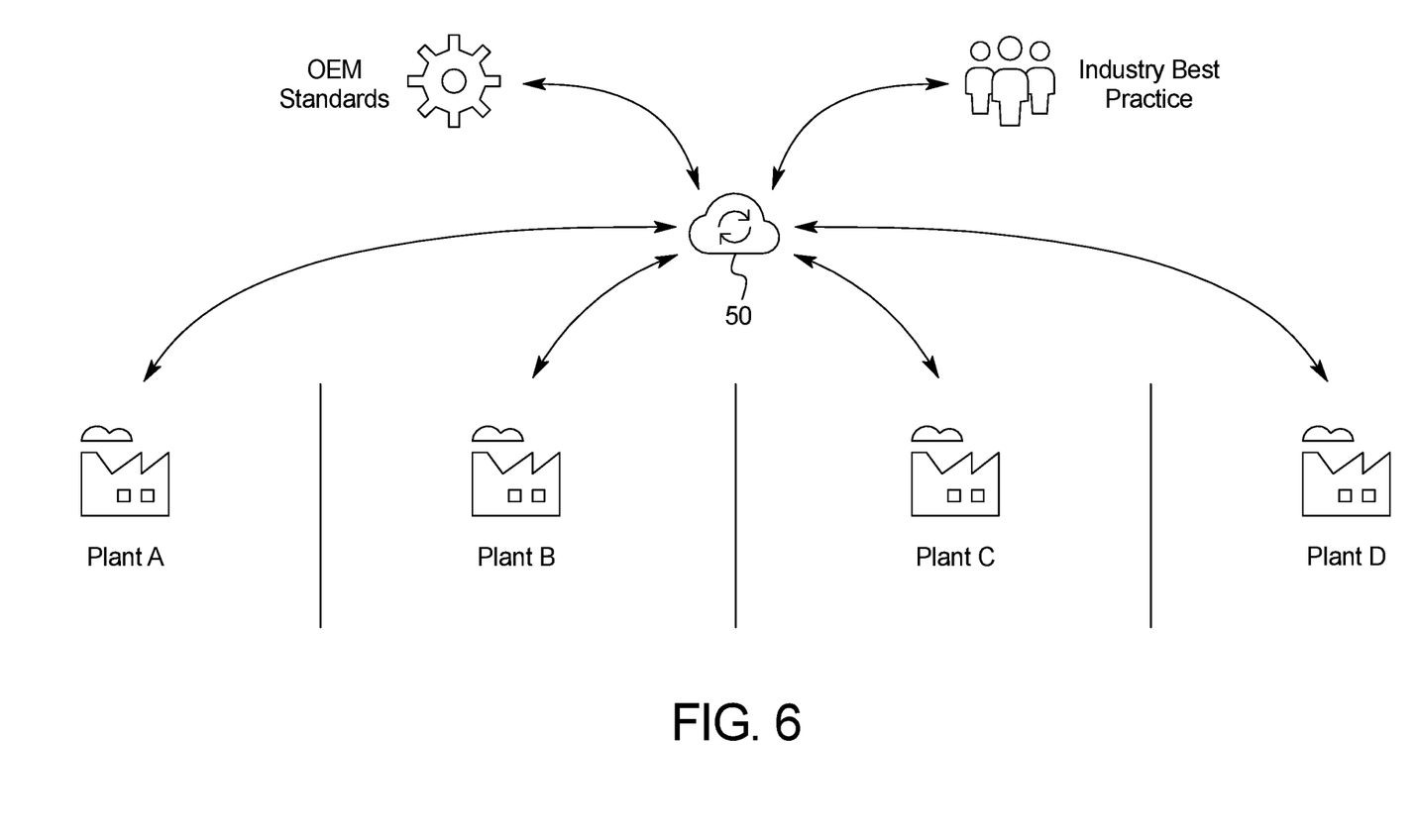
FIG. 6 is a schematic of an example of the system illustrating the system controller in communication with external sources, a plurality of plants and businesses.

FIG. 6 illustrates the interaction of the system 10 with external sources, such as OEM standards and Industry practices. This is a particularly useful interaction when one or more of the interactive procedure platform 14 routines incorporates an industry standard procedure. Such standard procedure can be identified in the metadata of the interactive procedure platform 14. Upon each use of the interactive procedure platform 14, the system 10 may automatically access an external source to confirm the OEM standard procedure is consistent with the version incorporated into the interactive procedure platform 14. For example, if an OEM standard is updated, the system 10 can automatically revise or modify the interactive procedure platform 14 to reflect the updated standard into the procedure steps 30. Moreover, the system 10 can also engage with a plurality of plants, businesses, etc. As a result, the system 10 can standardize industry best practices and procedures that can be immediately shared across all plants and industries.

The interactive procedure platform 14 may include a security feature requiring the user to input an authorization code received by a separate device. For example, the system 10 can send an authorization code to a user's mobile phone that the user must then input into the interactive procedure platform 14 before being authorized to begin the interactive procedure platform 14. For example, the system 10 can send a text message to the user's smart phone device, wherein the text message includes a message or number for the user to enter on the interactive procedure platform 14 to verify the user's authorization for the specific task step or entire procedure.

In another example, the system 10 can include a notification feature, wherein the system 10 automatically sends a notification to a third party to perform a task required in the procedure that the user cannot perform. In an example, the system 10 automatically sends the notification to a third party when a user has completed a task that is two or three tasks before the task the third party needs to complete. As a result, the notification feature can help in moving the work flow move along a more streamlined path and reduce downtime for the user to wait until the third party completes the task.

In another example, the system 10 visually indicates a placeholder on the interactive procedure platform 14 display. For example, the system 10 can include a horizontal bar separating the task elements that have been complete from the tasks that have not been complete. The horizontal bar moves down the "document" displayed via the interactive procedure platform 14 as each task element is complete. As a result, the user can easily identify where in the task list the user is presently. Therefore, if the user checks out of the "document" displayed via the interactive procedure platform 14 and at a later time checks back in to the document, the system 10 immediately indicates to the user what step the user should complete next without the user scrolling through pages to remember which tasks he completed and has yet to complete.

The system 10 can be comprised of two components: (1) an extraction component that takes the structured xml data from a word processor document and converts it to less complex but standardized format for consumption, and (2) a pattern recognition component that converts the standardized format into a basic digital work instruction. The extraction component can be implemented using off the shelf libraries licensed from a vendor. The pattern recognition component recognize various elements needed for creating a smart procedure, such as, but not limited to, ordering of steps/tasks, task types, notes, cautions, warnings, parent/child relationships between tasks, table conversion, and delineations between where work instruction steps begin and end. Without recognition of these elements and attributes, the resulting extracted content may be standardized, but would not provide the additional value provided by the present system.

As mentioned above, aspects of the systems and methods described herein are controlled by one or more controllers. The one or more controllers may be adapted to run a variety of application programs, access and store data, including accessing and storing data in the associated databases, and enable one or more interactions as described herein. Typically, the controller is implemented by one or more programmable data processing devices. The hardware elements, operating systems, and programming languages of such devices are conventional in nature, and it is presumed that those skilled in the art are adequately familiar therewith.

For example, the one or more controllers may be a PC based implementation of a central control processing system utilizing a central processing unit (CPU), memory and an interconnect bus. The CPU may contain a single microprocessor, or it may contain a plurality of microprocessors for configuring the CPU as a multi-processor system. The memory may include a main memory, such as a dynamic random access memory (DRAM) and cache, as well as a read only memory, such as a PROM, EPROM, FLASH-EPROM, or the like. The system may also include any form of volatile or non-volatile memory. In operation, the memory stores at least portions of instructions for execution by the CPU and data for processing in accord with the executed instructions.

The one or more controllers may also include one or more input/output interfaces for communications with one or more processing systems. Although not shown, one or more such interfaces may enable communications via a network, e.g., to enable sending and receiving instructions electronically. The communication links may be wired or wireless.

The one or more controllers may further include appropriate input/output ports for interconnection with one or more output mechanisms (e.g., monitors, printers, touchscreens, motion-sensing input devices, etc.) and one or more input mechanisms (e.g., keyboards, mice, voice, touchscreens, bioelectric devices, magnetic readers, RFID readers, barcode readers, motion-sensing input devices, etc.) serving as one or more user interfaces for the controller. For example, the one or more controllers may include a graphics subsystem to drive the output mechanism. The links of the peripherals to the system may be wired connections or use wireless communications.

Although summarized above as a PC-type implementation, those skilled in the art will recognize that the one or more controllers also encompasses systems such as host computers, servers, workstations, network terminals, and the like. Further one or more controllers may be embodied in a device, such as a mobile electronic device, like a smartphone or tablet computer. In fact, the use of the term controller is intended to represent a broad category of components that are well known in the art.

Hence aspects of the systems and methods provided herein encompass hardware and software for controlling the relevant functions. Software may take the form of code or executable instructions for causing a controller or other programmable equipment to perform the relevant steps, where the code or instructions are carried by or otherwise embodied in a medium readable by the controller or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as the memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a controller can read programming code and/or data. Many of these forms of computer readable media may be involved in carrying one or more sequences of one or more instructions to a processor for execution.

It should be noted that various changes and modifications to the embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

We claim:

1. A system comprising:
   a controller;
   a memory coupled to the controller, wherein the memory is configured to store program instructions executable by the controller;
   wherein in response to executing the program instructions, the controller is configured to:
      receive an original document including a plurality of tasks and associated original task elements to be completed by an end user;
      identify each original task element;
      associate a smart task element with each original task element, wherein the smart task element is a digital element responsive to user input of the end user;
      convert the original document into a digital smart document, wherein the smart document includes a plurality of smart task elements corresponding to the plurality of original task elements;
      display the digital smart document as an interactive procedure platform on a user interface of a mobile device;
      receive, from the end user through the interactive procedure platform on the user interface, user input via the plurality of smart task elements; and
      incorporate enriched content based on the user input into the digital smart document, wherein the enriched content comprises one of an automatic calculation based on the user input, a multimedia file collected using a camera functionality on the mobile device that is prompted based on the user input, and further user input collected through an expanded input box generated in response to the user input.

2. The system of claim 1, wherein the original document is a word processor document.

3. The system of claim 1, wherein the smart task element includes at least one of a check box, signature box, text box, image box, and combinations thereof.

4. The system of claim 1, wherein the controller is configured to store the received user input in a database in communication with the controller.

5. The system of claim 1, wherein the controller is configured to
   display the smart document on at least two mobile devices, and
   continually update the smart document upon receiving user input corresponding to a smart task element, wherein the controller displays the update on every mobile device displaying the smart document.

6. The system of claim 1, wherein the identification of the original task elements is derived from a combination of textual context and formatting context.

7. The system of claim 1, wherein the digital smart document includes a procedure defined by a third party that promulgates standards and the digital smart document automatically updates itself in response to an update to a digital library that publishes the third party standards.

8. The system of claim 1, wherein, in response to a user completing a step in a work flow provided by the interactive procedure platform, the mobile device automatically configures itself to capture appropriate media for a subsequent step.

9. The system of claim 1, wherein the controller is configured to incorporate additional enriched content comprising a date/time stamp and a user identification of the end user, wherein the date/time stamp and the user identification are recorded when the user input is received.

10. The system of claim 1, wherein the mobile device automatically configures itself to capture multimedia content.

11. The system of claim 1, wherein the user input comprises a number, and wherein the enriched content comprises the automatic calculation based on the number.

12. The system of claim 1, wherein the enriched content comprises the multimedia file collected using a camera functionality on the mobile device based on the user input, and wherein the multimedia file comprises one of a photograph, a video, and a sound file.

13. A system comprising:
   a controller;
   a memory coupled to the controller, wherein the memory is configured to store program instructions executable by the controller;
   wherein in response to executing the program instructions, the controller is configured to:

receive an original document including a plurality of tasks and associated original task elements to be completed by an end user;

identify each original task element;

associate a smart task element with each original task element, wherein the smart task element is a digital element responsive to user input of the end user;

convert the original document into a digital smart document, wherein the smart document includes a plurality of smart task elements corresponding to the plurality of original task elements, and wherein the plurality of smart task elements includes a set of smart task elements corresponding to a standardized procedure;

access an external digital library including an updated standardized procedure and confirm that the standardized procedure is consistent with the updated standardized procedure;

in response to the standardized procedure not being consistent with the updated standardized procedure, revise the standardized procedure to match the updated standardized procedure;

modify the set of smart task elements corresponding to the standardized procedure within the digital smart document to match the revised standardized procedure;

display the digital smart document as an interactive procedure platform on a user interface of a mobile device; and receive, from the end user through the interactive procedure platform on the user interface, user input via the plurality of smart task elements.

14. The system of claim 13, wherein the external digital library publishes an industry standard procedure, and wherein the standardized procedure comprises the industry standard procedure.

15. The system of claim 14, wherein the standardized procedure comprises one of a ASTM method.

16. The system of claim 13, wherein the external digital library publishes an industry best practices, and wherein the standardized procedure comprises the industry best practices.

* * * * *